US012484973B2

United States Patent
Schipper et al.

(10) Patent No.: US 12,484,973 B2
(45) Date of Patent: Dec. 2, 2025

(54) METHOD AND APPARATUS FOR RESECTING BONE USING A PLANER AND OPTIONALLY USING A ROBOT TO ASSIST WITH PLACEMENT AND/OR INSTALLATION OF GUIDE PINS

(71) Applicant: INTELLIJOINT SURGICAL INC., Kitchener (CA)

(72) Inventors: Joseph Arthur Schipper, Kitchener (CA); Andre Novomir Hladio, Waterloo (CA); Quang Minh Tuan Le, Toronto (CA)

(73) Assignee: INTELLIJOINT SURGICAL INC., Kitchener (CA)

( * ) Notice: Subject to any disclaimer, the term of this patent is extended or adjusted under 35 U.S.C. 154(b) by 214 days.

(21) Appl. No.: 18/223,671

(22) Filed: Jul. 19, 2023

(65) Prior Publication Data

US 2024/0024036 A1 Jan. 25, 2024

Related U.S. Application Data

(60) Provisional application No. 63/391,058, filed on Jul. 21, 2022.

(51) Int. Cl.
| | |
|---|---|
| A61B 34/20 | (2016.01) |
| A61B 17/17 | (2006.01) |
| A61B 34/00 | (2016.01) |
| A61B 34/30 | (2016.01) |
| A61B 34/35 | (2016.01) |
| A61B 90/00 | (2016.01) |

(52) U.S. Cl.
CPC ......... *A61B 34/20* (2016.02); *A61B 17/1703* (2013.01); *A61B 34/25* (2016.02); *A61B 34/35* (2016.02); *A61B 2034/2055* (2016.02); *A61B 2034/2059* (2016.02); *A61B 2034/2065* (2016.02); *A61B 2090/062* (2016.02)

(58) Field of Classification Search
CPC ...... A61B 17/16–17/1697; A61B 34/00–34/77
See application file for complete search history.

(56) References Cited

U.S. PATENT DOCUMENTS

| | | | | |
|---|---|---|---|---|
| 4,467,801 | A * | 8/1984 | Whiteside | A61B 17/1764 606/88 |
| 8,114,087 | B2 * | 2/2012 | Long | A61B 17/1778 606/87 |

(Continued)

*Primary Examiner* — Zade Coley

(57) ABSTRACT

There is provided a method to perform bone resection using a planer. Under guidance of a surgical navigation system, and, optionally, under command of a robotic system, a trackable surgical instrument is guided to a target pose on a target bone. The bone may be a femur or tibia in a TKA. The trackable instrument comprises a drill or a pin guide for mounting a pair of pins, preferably graduated pins to select a resection depth. A pin end is inserted into the planer and the planer operated to resect until the pin end bottoms out. A robot may command movement of the trackable instrument to the target pose. The target pose may be received or determined from surgical pre-planning or intra-operative activities such as tracked measurements, user input, etc. The navigation system presents information such as measurements and/or image overlays to guide the placement.

20 Claims, 5 Drawing Sheets

(56) References Cited

U.S. PATENT DOCUMENTS

| | | | | |
|---|---|---|---|---|
| 8,403,934 | B2* | 3/2013 | Angibaud | A61B 17/155 |
| | | | | 606/88 |
| 8,491,586 | B2* | 7/2013 | Lechot | A61B 17/1617 |
| | | | | 606/85 |
| 10,271,858 | B2* | 4/2019 | Guilloux | A61B 17/1637 |
| 10,398,450 | B2* | 9/2019 | Rasmussen | A61B 17/1764 |
| 2002/0133160 | A1* | 9/2002 | Axelson, Jr. | A61B 17/154 |
| | | | | 606/88 |
| 2007/0038302 | A1* | 2/2007 | Shultz | A61F 2/4081 |
| | | | | 606/85 |
| 2007/0270685 | A1* | 11/2007 | Kang | A61B 90/03 |
| | | | | 600/424 |
| 2012/0116405 | A1* | 5/2012 | Long | A61B 17/1684 |
| | | | | 606/87 |
| 2014/0236159 | A1* | 8/2014 | Haider | A61B 17/1626 |
| | | | | 606/88 |
| 2016/0242934 | A1* | 8/2016 | van der Walt | A61F 2/4684 |
| 2016/0345987 | A1* | 12/2016 | Guilloux | A61B 17/1635 |
| 2020/0397514 | A1* | 12/2020 | Dees, Jr. | A61B 90/39 |
| 2021/0121234 | A1* | 4/2021 | Richard | A61B 34/20 |
| 2022/0104835 | A1* | 4/2022 | Blaser | A61B 17/1659 |
| 2023/0380905 | A1* | 11/2023 | Richard | A61B 34/10 |

* cited by examiner

METHOD AND APPARATUS FOR RESECTING BONE USING A PLANER AND OPTIONALLY USING A ROBOT TO ASSIST WITH PLACEMENT AND/OR INSTALLATION OF GUIDE PINS

CROSS-REFERENCE

This application claims a domestic benefit of U.S. Provisional Application No. 63/391,058 filed, Jul. 21, 2022, the entire contents of which are incorporated herein by reference.

FIELD

This application relates to computer assisted surgical procedures and to methods and apparatus therefor. More particularly, this application relates to a method and apparatus for resecting bone using a planer and optionally using a robot to assist with placement and/or installation of guide pins.

BACKGROUND

In a knee arthroplasty procedure, particularly a total knee arthroplasty (TKA), soft tissue surfaces and an amount of underlying bone are removed from each of a distal femur and a proximal tibia. In one method, an initial portion of the femur is resected via a distal femoral cut to remove, for example, 9 mm of bone. A 4-in-1 cutting guide is mounted for making four cuts (e.g. anterior and posterior femoral cuts and anterior and posterior chamfer cuts) prior to mounting the femoral implant. The distal femoral cut is guided by a distal femoral cutting guide to enhance accuracy to achieve a desired anatomic alignment and joint line. One example of a distal femoral cutting guide is an intramedullary cutting guide. Thus two separate cutting guides each having separate mounting means are used to make the femoral cuts.

There is a need for an alternative approach to resections in knee and other procedures.

SUMMARY

There is provided a method to perform bone resection using a planer, for example a planer with a central pin receiving channel. Under guidance of a surgical navigation system, and, optionally, under command of a robotic system, a trackable surgical instrument is guided to a target pose on a target bone. The bone may be a femur or tibia in a TKA. The trackable instrument comprises a drill or a pin guide for mounting a pair of pins, preferably graduated pins to select a resection depth. A pin end is inserted into the planer and the planer operated to resect until the pin end bottoms out. A robot may command movement of the trackable instrument to the target pose. The target pose may be received or determined from surgical pre-planning or intra-operative activities such as tracked measurements, user input, etc. The navigation system presents information such as measurements and/or image overlays to guide the placement.

There is provided a method aspect comprising a computer-implemented method. A computer-implemented method comprises: tracking the pose of: a first tracker associated with a target bone, the first tracker providing target bone pose data; and a second tracker associated with a surgical instrument, the second tracker providing surgical instrument pose data; receiving or determining a target pose for the surgical instrument to be positioned, the target pose defined relative to the target bone; and presenting surgical navigation guidance information using one or both of surgical instrument pose data and target bone pose data, updating the surgical navigation guidance information as the surgical instrument pose data updates in response to movement of the surgical instrument. In the method, the target bone is a bone to be resected by a planer; and the surgical instrument comprises one of: a trackable drill for inserting a pin into the target bone, the pin to guide the planer while cutting; or a trackable pin guide to guide an insertion of the pin into the target bone, the pin to guide the planer while cutting.

Any computer-implemented method aspect herein has a corresponding computing system or apparatus aspect, including a computer program product aspect. For example, a computer program product may comprise a (non-transitory) storage device storing (computer-readable) instructions that, when executed by a processor of a computing device cause the computing device to perform operations of any computer-implemented method described herein.

BRIEF DESCRIPTION OF THE DRAWINGS

FIGS. 2A and 2B are illustrations of a portion of a planer, in accordance with a prior art embodiment, while

DETAILED DESCRIPTION

In accordance with a broad teaching herein, a planer, having a central pin guide channel, is used to perform a distal femoral cut or proximal tibial cut, or both, during knee arthroplasty. Though the description herein in generally set out in relation to the femur, it will be understood to a person of ordinary skill in the art that the teachings herein can be applied to the tibia.

In an embodiment, pins (e.g. a pair of spaced pins) are installed in the patient's femur to guide the planer cut in terms of both position and depth of resection. In an embodiment, the pins (e.g. pilot pins or guide pins) are insertable using a standard surgical drill. In an embodiment, locating the pins on the femur involves tracking the drill or placing a pin guide using a surgical navigation system. In an embodiment, a robot such as a four degree of freedom (4-DOF) robot, is used to ensure the pin guide is placed as accurately as possible. In an embodiment, a 6-DOF robot is used to accurately place the pin guide and install the pins automatically, or to install the pins automatically without need to install a pin guide. In terms of some practical considerations, it will be understood to a person of ordinary skill in the art that the 4-DOF robot will be smaller, taking up a smaller footprint within the OR, and will also be considerably less expensive compared to the 6-DOF robot.

In an embodiment, following use of the planer that provides an alternative device for performing distal femur resection (and tibial resection), the same pin holes can be used to mount a 4-in-1 cutting guide. As such, in accordance with the methods, apparatus and general techniques herein, steps used for initial femoral and/or tibial resection may be reduced.

Figure 1:
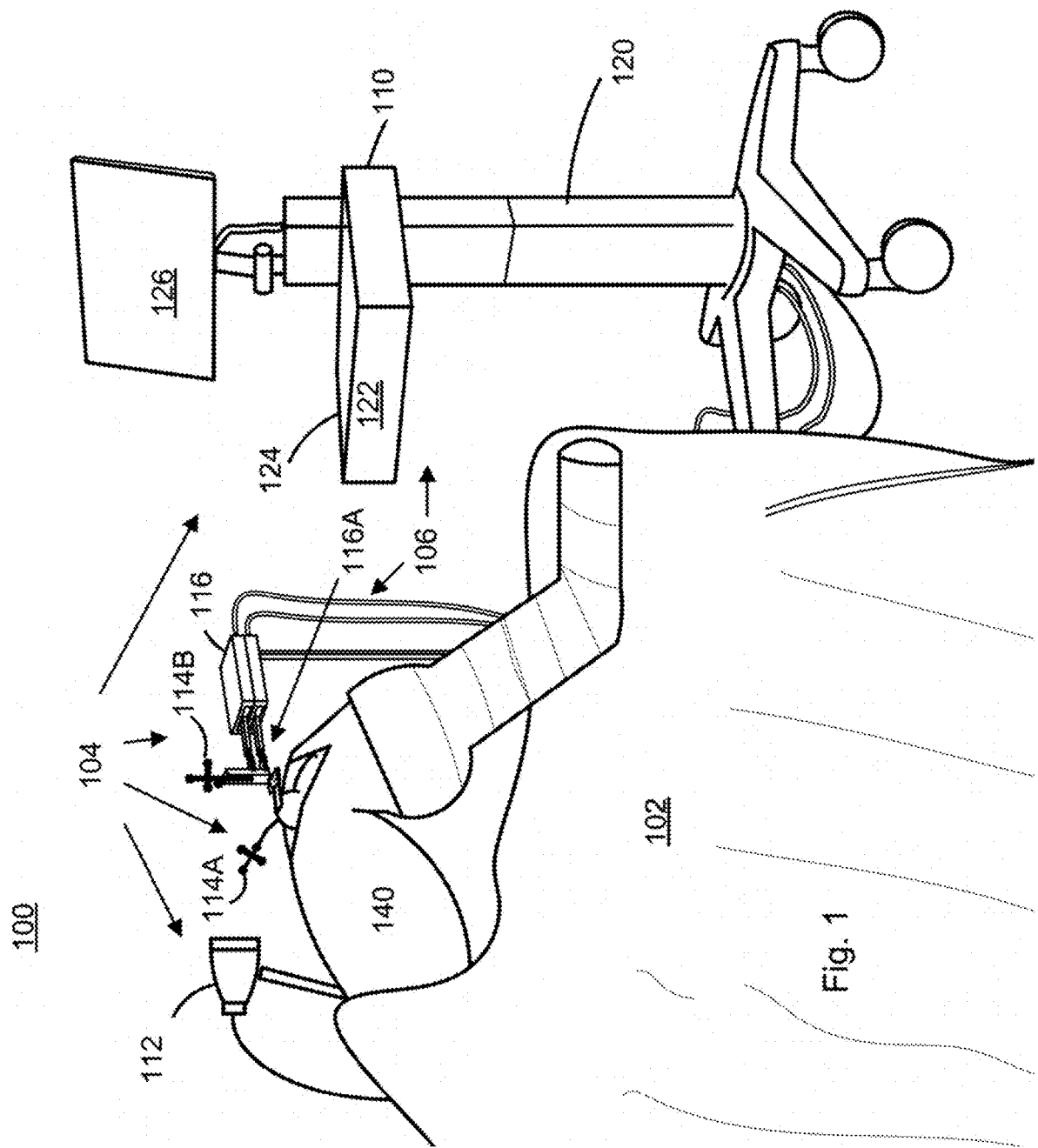
FIG. 1 is an illustration of an operating room (OR) showing a surgical navigation system and a robotic system in accordance with respective embodiments herein.

FIG. 1 is an illustration of an OR 100 in accordance with an embodiment showing a draped patient 102, a surgical navigation system 104, and a robotic system 106. The draped patient 102 is draped for a representative TKA procedure.

The surgical navigation system 104 comprises a computing device 110, an optical sensor 112 (e.g. comprising a camera) coupled to the computing device, and at least one tracking device or tracker (e.g. 114A and 114B) to provide optical signals to the optical sensor. Tracking devices and trackers may also be referred to as targets in the prior art. The trackers are respectively coupled to objects to be tracked in the OR 100 by surgical navigation system 104. The respective optical signals from the trackers' signals may be processed such that the tracking devices provide pose data for the respective objects to which the trackers are coupled. Trackers are detectable by the optical sensor and thus passively or actively provide light to the optical sensor. In this context, "active" refers to the ability of the tracker to emit light. In contrast, a "passive" tracker is a tracker which reflects, disperses, or diffuses light from another light source. The trackers comprise a plurality of bodies having light emitting or reflecting surfaces. The surfaces are arranged for unique presentation so that each image of a tracker's surfaces uniquely identifies the pose of the tracker. This unique pose can be used to uniquely represent the pose of the object to which it is coupled. A computing device may be programmed to determine the pose of the tracker and then the pose of the object. Geometric data for the tracker and the object and the association of the two (i.e. when the tracker and object are coupled together in a known manner) can be stored to the computing device to assist with such a determination. Representative optical sensors and trackers have been disclosed in Applicant's U.S. Pat. No. 9,247,998, granted Feb. 2, 2016 and entitled "System and Method of Intra-Operative Leg Position Measurement", and U.S. Pat. No. 9,603,671 granted Mar. 28, 2017 and entitled, "Systems, methods and devices for anatomical registration and surgical localization" the contents of each of which are incorporated herein by reference in their respective entireties.

Robotic system 106 comprises a robot 116 coupled to a computing device (e.g. 110) such as for controlling the robot and/or presenting information received therefrom. Though a single computing device 110 is shown for both the surgical navigation system 104 and the robotic system 106, separate respective computing devices may be used. In an embodiment, robot 116 is a 4-DOF robot and in an embodiment robot 116 is a 6-DOF robot. An example of a robot is a Micromate™ medical robot made by Interventional Systems/iSYS Medizintechnik GmbH of Kitzbuhel, Austria.

In the embodiment, computing device 110 is shown mounted to a movable (and height adjustable) stand 120 and comprising a keyboard tray 122 supporting a keyboard 124 and a display 126, which input and output devices are coupled to the computing device. Not shown for the computing device are a processor and a storage device such as memory that stores instructions that, when executed by the processor, cause the computing device 110 to preform various functions and operations, for example, in accordance with the method aspects shown and described.

While optical sensor 112 is illustrated with a wired connection to computing device 110, in an embodiment a wireless connection may be used. In an embodiment additional or other display devices may be used alone or in combination such as a heads-up display device. In an embodiment additional or other input devices such as buttons (e.g. on the optical sensor or foot controlled), a microphone, a touch screen, a pointing device, etc. may be used.

Optical sensor 112 may comprise a processor and one or more additional sensors such as accelerometers, gyroscopes, magnetometers, etc. Though shown undraped, optical sensor 112 may be draped in an embodiment. Though shown mounted to an object (e.g. the OR table under draped patient 102) in an embodiment optical sensor 112 may be movable, including hand-held, at least for a portion of a procedure. Optical sensor 112 provides sensor data to computing device 110 for computing device 110 to track objects in the real three dimensional space of OR 100, e.g. within the field of view of optical sensor 112. Objects may include any one or more of the patient or a portion thereof (e.g. femur, tibia, pelvis, etc.), surgical instruments, implants, etc. It is understood that the camera and objects are registered to surgical navigation system 104 in accordance with a registration procedure or procedures. For example, a method and system for surgical navigation has been disclosed in applicant's U.S. Pat. No. 9,247,998, granted Feb. 2, 2016 and entitled "System and Method of Intra-Operative Leg Position Measurement", the content of which is incorporated herein by reference in its entirety.

TKA with Planer

In an embodiment, a procedure (e.g. a TKA) is performed using a planer in which guide pins for the planer are placed in the target bone. Pins, for example a pair of pins, are spaced relative to one another across the target bone sufficiently so that the planer can be mounted respectively on each and resect a desired amount of the target bone (e.g. to a desired depth). Preferably, the spacing and location of the pin holes on the target bone can correspond to that of a cutting guide useful in a next step of TKA. For example, the cutting guide may be a 4-in-1 cutting guide useful for guiding anterior, posterior, chamfer, and trochlear recess notch cuts of a femur. In an embodiment, placement of the pins is guided by surgical navigation system 104. In an embodiment, placement is guided by surgical navigation system 104 and controlled by robotic system 106. In an embodiment, the surgical navigation system guides a trackable surgical instrument comprising a trackable pin guide or trackable drill. In an embodiment, the surgical navigation system guides the placement of pins to meet the requirements of both the planer and the cutting guide. In an embodiment, the trackable pin guide has spaced pin holes that meet the requirements of both the planer and the cutting guide.

Figure 2A:
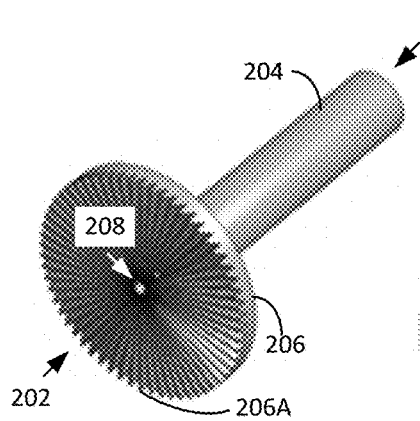
Figure 2B:
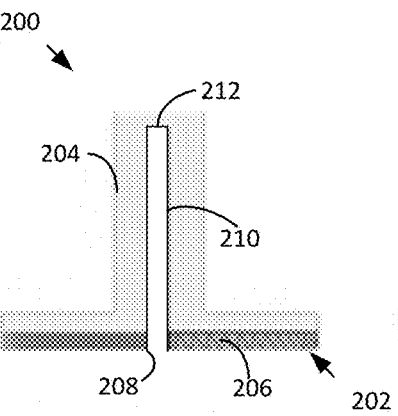

FIGS. 2A and 2B are illustrations of a portion of a planer 200, in accordance with a prior art embodiment, for use with one or more methods herein. FIG. 2A shows an isometric view from the distal end 202 for engaging bone to be resected. The distal end is mounted to a central stem 204. FIG. 2B shows a cross-section of the planer 200 of FIG. 2A. A bone engaging surface 206 has a plurality of cutting edges (e.g. 206A) and forms an opening 208 to the central stem 204 into a central pin receiving channel 210 having an end surface 212, better viewed in FIG. 2B. Central stem 204 is shown truncated and typically extends farther (though its dimension may change from that shown) to mount via a chuck to power equipment (not shown), such as drill gun. In use, the planer 200 is driven radially by the power equipment to rotate about a central axis of the planer 200. It will be understood that the cutting edges (e.g. 206A) are representative and other shapes, sizes and number of edges can be configured.

Figure 2C:
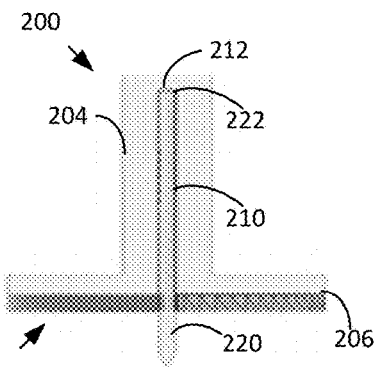
FIG. 2C shows the planer of FIG. 2B mounted to a guide pin.

FIG. 2C shows the planer 200 of FIG. 2B mounted with a pin 220 in pin receiving channel 210 and abutting end surface 212. Embedding pin 220 into the bone to a selected depth, or such that a selected length remains exposed, can be used to determine the depth of the bone cut. In use, when the guide pin is inserted into the planer and planer is operated, the cutting is stopped when the proximal end 222 of the pin 220 abuts end surface 212.

Figure 2D:
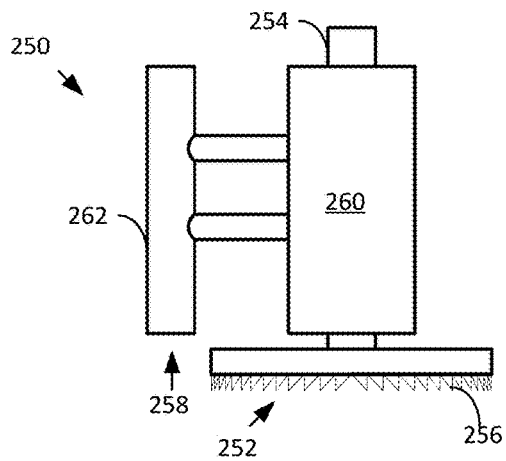
FIG. 2D illustrates an alternative planer, in accordance with an embodiment herein.

FIG. 2D shows an alternative planer 250, in accordance with an embodiment herein. A distal end 252 is mounted to a central stem 254. A bone engaging surface 256 has a plurality of cutting edges. Central stem 254 is mounted through a pin collar 260 that is coupled to a pin stem 262. Pin stem 262 forms an opening 258 to the pin stem 262 at the same end as bone engaging surface 256. Though not shown, pin stem 262 defines a central pin receiving channel having an end surface against which a pin abuts when fully inserted. Central stem 254 is shown truncated and typically extends farther (though its dimension may change from that shown) to mount via a chuck to power equipment (not shown), such as drill gun. In use, the planer 250 is driven radially by the power equipment to rotate about a central axis of the central stem 254. It will be understood that the cutting edges are representative and other shapes, sizes and number of edges can be configured.

It will be understood that the cutting surface for planer 250 is offset from the pin location. Placing of the pin at a pin location is performed accordingly. In an embodiment, the central pin receiving channel is other than circular in cross-section to cooperate with a pin shape that is, at least in part, other than circular in cross-section, for example toward an end of the pin that is received in the channel. The cooperating surfaces of the central pin receiving channel and the non-circular surface of the pin that is received in the channel permits the pin and pin stem to move longitudinally relative to one another (e.g. when the pin is in the pin receiving channel) but does not permit relative rotation, thereby limiting the area of the cutting surface of the planer.

Figure 3:
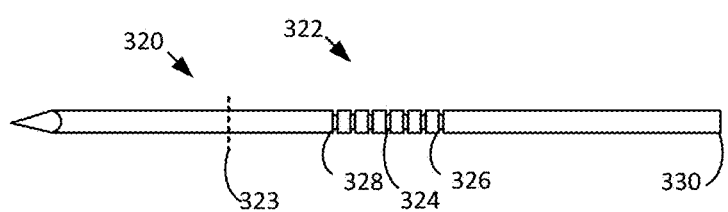
FIG. 3 is an illustration of a graduated guide pin, in accordance with a prior art embodiment.

FIG. 3 illustrates a prior art embodiment of a graduated pin 320 comprising at least one and, preferably (as shown), a plurality of graduations 322 denoting length measures along the pin 320. Graduations are illustrated as notches or changes in the dimension of the pin 320 though other indicators such as a gnarled surface or printed surface can be used for graduations. Dotted line 323 denotes the transvers cutting plane of planer 200 when mounted over the pin 320, for example, when the pin is not positioned in bone. The depth of the channel 212 of planer 200 corresponds to the length from the end 330 to the transverse cutting plane 323. In an embodiment, the graduated pin 320 is mounted so that end 330 is inserted within the chuck of a drill to a depth that is guided by the graduations. In another graduated pin embodiment (not shown), for example, for use with a robot guided trackable drill, a single graduation can be used to set the depth of the pin in the chuck. Guidance of the drill, for example, using 5-DOF control and thus with a suitable robotic manipulator provide 5- or 6-DOF controls), can then determine the depth of placement of the pin in the bone. In an alternative to graduated pins, a collared pin (not shown) can have a depth collar to restrict the depth placement into the chuck to a known depth such that a known amount of pin remains exposed, extending from the drill for placement into bone. In an example, pins with different lengths can be used. The depth of pin placement can be guided by guiding the drill.

Figure 4:
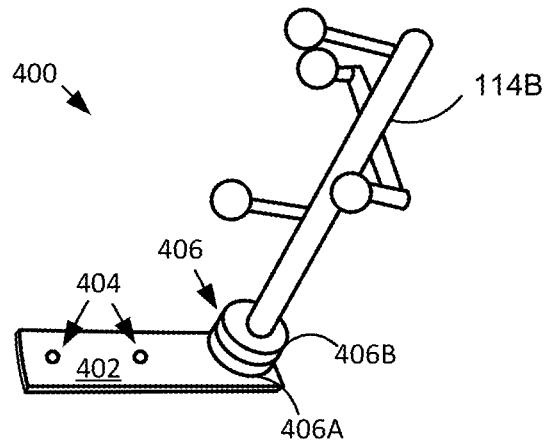
FIG. 4 is an illustration of a trackable pin guide 400, in accordance with an embodiment.

In the illustrated embodiment in FIG. 3, the graduations are 3 mm apart. Other measures can be used. Graduation 324 denotes 0 mm. Graduations 326 and 328 respectively denote 9 mm and −9 mm relative to graduation 324. As the graduations are useful to indicate the amount of bone to be removed, their placement on the pin may vary depending on whether or not a pin guide is used to mount the pins to the target bone. A trackable pin guide 400 is shown in FIG. 4 and described further herein below.

If a pin is to be set without use of a pin guide, for example, manually using a trackable drill, the graduations would be placed differently in the pin. Cutting plane 323 would be coincident with the 0 marking 324, and the pin would only have additional graduations, relative to pin orientation of FIG. 3, to the right of it. There would be no need for graduations below 0 (to the left) since positioning the pin to make negative depth cut could not occur. Such a manner of positioning pins may not be preferred. Manually controlling the position and orientation of the drill, while drilling, even with guidance from a navigation system visualizing the target, is challenging and may not meet clinical requirements.

If a pin guide is used, a user selects one of the graduation markings for chucking the pin based, for example, upon information equating resection depth to respective markings. In an embodiment, the information is presented by surgical navigation system 104. The information can account for the geometry (e.g. thickness) and position of the pin guide (e.g. on the anatomy). t. In an embodiment, two pins 322 (e.g. a first pin and a second pin) are placed in a spaced relation so that the planer cuts the whole of the desired surface. In an embodiment, the pin placement of the two pins is the same placement as to be used with a 4-in-1 cutting guide to cut the remainder of the surfaces of the bone for the TKA procedure.

Once the pair of pins 322 are mounted to the desired depth, planer 200 is positioned over a first guide pin 322 and operated to remove bone until the proximal end 330 abuts the end surface 212 of pin channel 210, for example, removing 9 mm of bone in the process. Planer 200 is then positioned over a second guide pin 322 and operated to remove bone, for example, removing 9 mm of bone in the process.

FIG. 4 is an illustration of a trackable pin guide 400 in accordance with an embodiment. Trackable pin guide 400 comprises a body 402 through which are defined a pair of spaced pin holes 404. Body 402 supports a cooperating portion 406A of a quick connect mechanism 406, the other portion 406B of which is coupled to a tracker (e.g. 114B). Quick connect mechanism 406 provides a repeatable connection such that the tracker 114B and body 402 couple in a known manner (i.e. such that the spatial relationship between the tracker and the spaced pin holes 404 is known) so that the pose of the tracker is useful to determine the pose of the body 402, and, specifically, the pin holes 404. Trackable pin guide 400 may then be held in place and respective pins positioned in the bone via the holes 404, for example, using graduated pins as described. It will be understood that trackable pin guide 400 and, particularly, body 402 thereof, is shown as a simple construction. In an alternative construction (not shown), trackable pin guide is adjustable. Adjustable trackable pin guide can be mounted to the bone in a rough position guided by the surgical navigation system and fine adjustment made, such as manually in multiple degrees of freedom, for example, to locate the pin holes to a desired target position. Such an adjustable trackable pin guide may be similar to an adjustable cutting guide. In such an embodiment, tracker 114B is coupled to the pin guide in such a way that its pose is also adjusted in response as the fine adjustments made to the trackable pin guide. That is, the tracker moves with the fine movements of the pin guide.

As noted, the pin placement may be performed using system 104 or system 104 together with system 106, such as further described herein.

Figure 5:
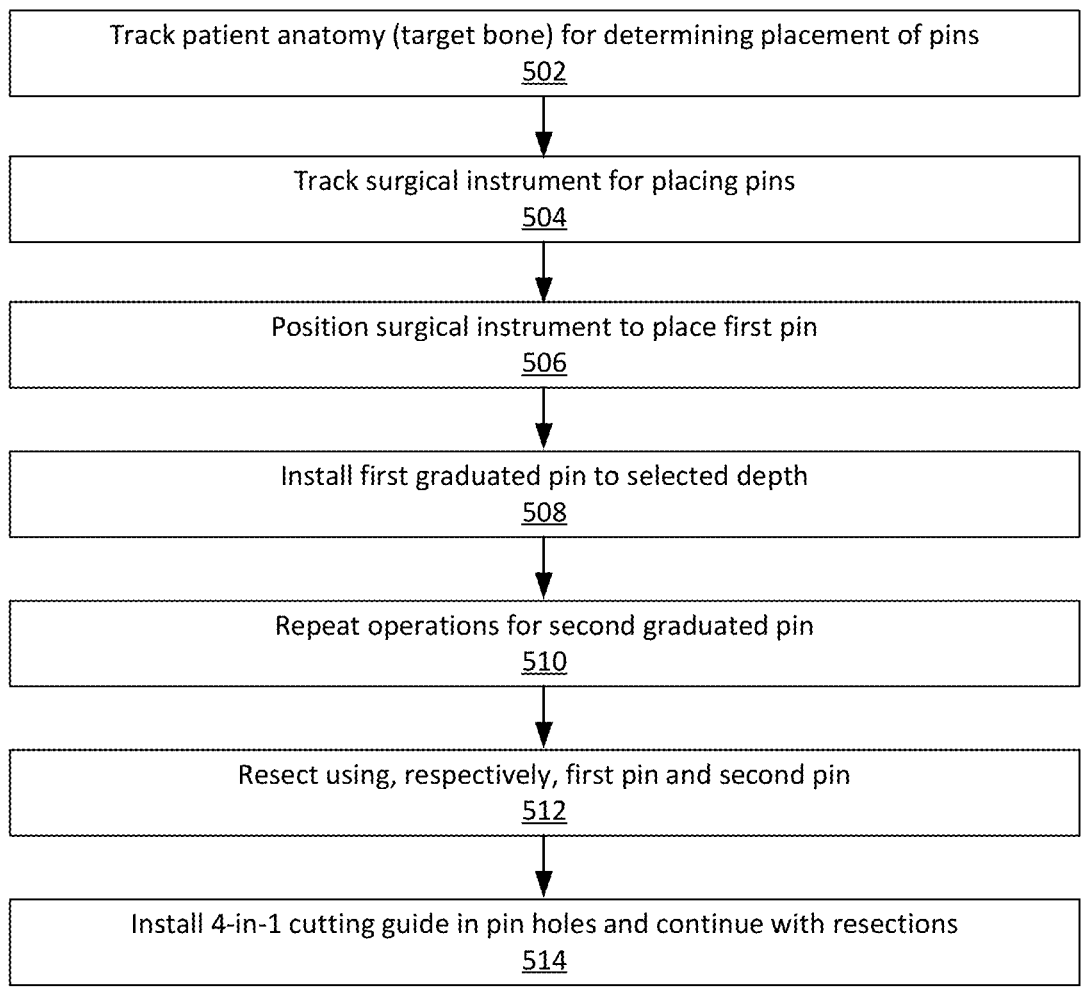
FIG. 5 is a flowchart of operations of a method in accordance with an embodiment.

FIG. 5 is a flowchart of operations 500 of a method in accordance with an embodiment. Operations 500 show steps for a practitioner, such as a surgeon, to perform a portion of a TKA using a planer. The portion of the TKA is steps to remove end surfaces of a femur, for example.

It will be appreciated by a person of ordinary skill in the art that the operations 500 recite engagement with a surgical navigation system and/or a robotic system such as respective systems 104 and 106 shown in FIG. 1. As such, operations 500 disclose corresponding operations of such a surgical navigation system 104 and/or a robotic system 106, which corresponding operations are further described herein. To assist the practitioner during operations 500, the respective systems perform various respective steps of one or more computer-implemented methods. For example, in an embodiment, a computing device of the surgical navigation system tracks the pose of: a first tracker (e.g. 114A) associated (e.g. coupled) with a target bone, where the first tracker provides target bone pose data to the computing device; and a second tracker (e.g. 114B) associated (e.g. coupled) with a surgical instrument (e.g. a trackable drill or a trackable pin guide), where the second tracker provides surgical instrument pose data. In an embodiment, the computing device is coupled to an optical sensor (e.g. 112) to receive signals from the trackers (e.g. related to the provided pose data). The computing device receives or determines a target pose for the surgical instrument to be positioned, where the target pose is defined relative to the target bone. The computing device presents surgical navigation guidance information using one or both of the surgical instrument pose data and the target bone pose data, updating the surgical navigation guidance information as the surgical instrument pose data updates in response to movement of the surgical instrument (e.g. performing real-time tracking updates). It will be understood that the computing device can perform registration of the objects to the computing device, and, in an embodiment register and associate same to real-time images of the target bone (e.g. of the surgical site) and/or a computer model of the target bone, whether such is a generic model of that type of bone or is a patient specific model for a patient's target bone. Models can be created from pre-operative patient data such as from various imaging modalities as is known to those of ordinary skill in the art.

In an embodiment, the computing device can generate measurements (e.g. relative or absolute measurements) for presentation as surgical navigation guidance information, including clinically relevant distances or angles. In an embodiment, the computing device can generate overlays for presentation as surgical navigation guidance information. Such overlays may be useful to present virtual or augmented reality images, comprising one or move overlays that are displayed over another image such as a real-time image or an image from a model. The overlays may represent "live" poses of objects or a target pose or poses that an object is to take during the procedure.

By way of example, in an embodiment, an overlay may present the target pose of the surgical instrument in relation to the target bone. The overlay may present the live pose (responsive to a target pose in the OR) of the trackable surgical instrument. The overlay may illustrate a ray or vector extending from a pin coupled to a trackable drill, for example, to illustratively guide alignment of the pin with a target location for the pin on the bone. The overlays may be generated and displayed in response to a field of view of the camera and can be updated responsive to a movement of the camera (e.g. relative to the target bone). In an example, the overlay of a target pose is generated from a 3D model of the trackable surgical instrument or another representation therefor, for example, to show the target pose in 3D. Overlays in the context of surgical navigation, including knee procedures, are disclosed in Applicant's U.S. patent application US20210121237A1, published Apr. 29, 2021 and entitled, "Systems and methods for augmented reality display in navigated surgeries", the entire contents of which are incorporated herein by reference.

Referring again to FIG. 5, following initial set up and the exposing of target bone, at 502, the portion of the patient having the target bone is tracked by surgical navigation system 104. It will be understood that, in an embodiment, a tracker 114A is attached to the target bone and registered to surgical navigation system 104.

At 504, a surgical instrument to assist with pin placement is tracked. A tracker (e.g. 114B) is attached to the instrument and registered to surgical navigation system 104. In an embodiment, the surgical instrument is a trackable drill (not shown) to drive in the pins without a pin guide. In an embodiment, the instrument is a pin guide such as pin guide 400. In a pin guide embodiment, for example, placement of the pin guide 600 is controlled by robotic system 106 and robot 116 (such as a 4-DOF robot). It will be understood that the robot 116 may require calibration. Calibration may involve teaching a robotic system 106 where the tracker is 114B is relative to a robot space (e.g. a coordinate system) maintained by the robotic system 106. For example a spatial relationship may be taught between the pin guide at 0 degrees of rotation and the robot or similarly between the tracker 114B and the robot 116. Such information can be known based on design/manufacture of components and pre-programmed or can be determined by a registration process.

At 506, a first graduated pin 320 is positioned using the surgical instrument as guided by surgical navigation system 104. A practitioner such as a surgeon can define (e.g. set) a location of pin holes and resection depth. For example, such may be defined using a pre-operative surgical planning system, using an assumed placement based on an anatomical landmark, i.e. knee center, using targets defined based on intra-operative measurements provided by surgical navigation system 104, (e.g. a varus/valgus angle, a flexion/extension angle, a lateral resection level, and a medial resection level with respect to the patient's bone, etc.)

During the procedure, the surgical navigation system can provide a user (e.g. the practitioner) with default target pin positions to confirm or such a user may set their own. In an embodiment, targets for the pin placement account for 4-in-1 cutting guide pin placement (e.g. to reuse same holes) as described further herein.

Figure 6A:
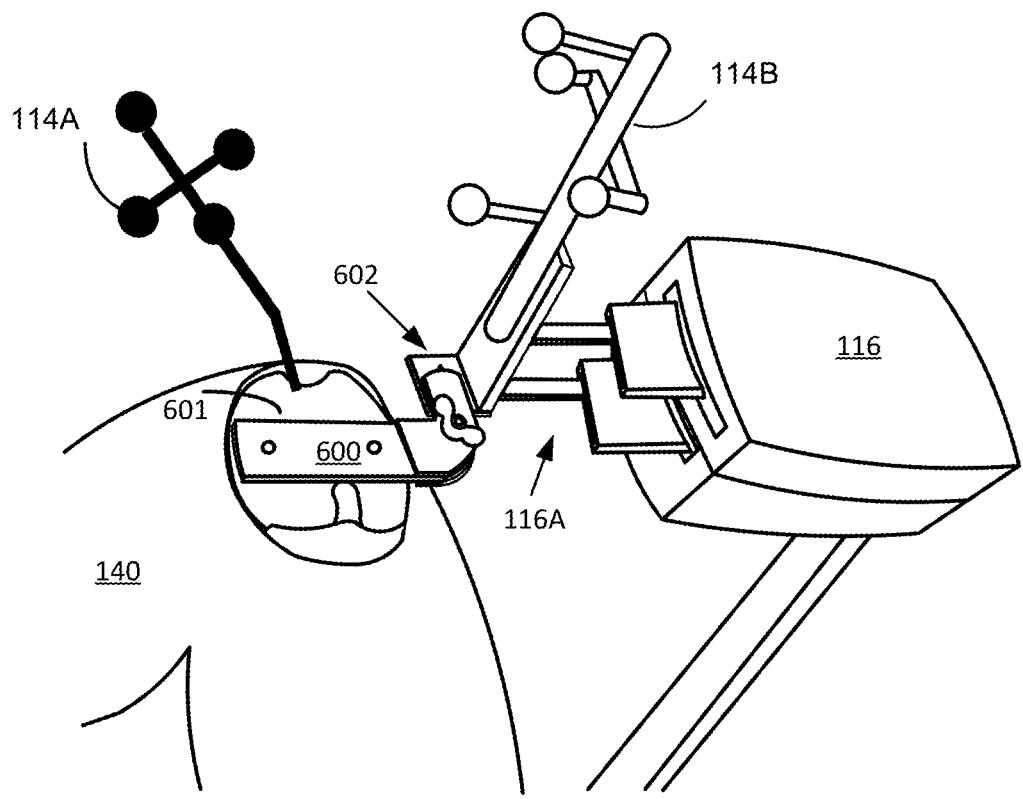
FIG. 6A shows a robot coupled to a trackable pin guide in a first position at a surgical site, in accordance with an embodiment.

Still within the context of step 506 but in an embodiment to position a pin guide with robot 116, in a first sub-operation, the trackable pin guide 600 is coupled to the robot 116. Robot 116 has a small working volume about its working end 116A and requires an initial positioning so that the working end 116A (and the trackable pin guide coupled thereto as shown in FIG. 6A) is adjacent to the target pose on the target bone for the pin guide 600, i.e. within the working volume. In other words, placement of the pin guide comprises two steps. The first step is rough positioning, which involves manual positioning of the robot within a defined boundary to the target pose, as described further below. The second step is a fine adjustment, which is automatically executed via robot 116 to place the pin guide in the target pose. Rough positioning is necessary to place robot 116 in a position from where it can achieve the target pin guide position via fine adjustment, accounting for the working volume of the robot, as described further below.

In rough positioning (i.e. a rough alignment of the trackable surgical instrument to the target pose), the robot is manually placed initially so that the trackable surgical instrument is within a boundary about the target pose that provides margin to the outer bounds of the robot's working volume, for example, ensuring the robot (i.e. the trackable surgical instrument coupled to the robot) is within a boundary defined, by way of example, as 75% of the outer boundary. A workspace or working volume is bounded by the amount of travel the robot can perform for each of the degrees of freedom for which it is configured to move. The amount of travel in some directions is 0 mm where the robot has no freedom to move. The amount of travel in other directions is for example, 40 mm, but the robot's freedom to move may not be equal in other directions. That is, the robot may have an ability to move farther in the X direction than in the Y direction. Rough positioning is therefore necessary to put the robot in a position from which it can achieve a desired target position accounting for the robot's workspace (i.e. the robot's range of travel in each direction). In an embodiment, the boundary may correspond to more than just a physical working volume. For example, it comprises an abstract parameterized working volume including information about robot translation and rotation capability in relation to the volume. The skilled person will readily appreciate that an abstract parameterized working volume may further comprise additional configurable parameters of the system (i.e. sizing and/or offsets of components, etc.). In accordance with an embodiment, rough alignment positions the trackable surgical instrument within an inner volume of the boundary as further explained.

Figure 6B:
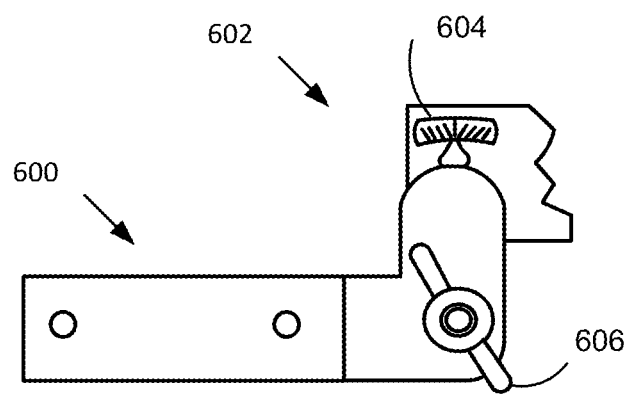
FIG. 6B is an enlarged view of a portion of the trackable pin guide of FIG. 6A.
Figure 7:
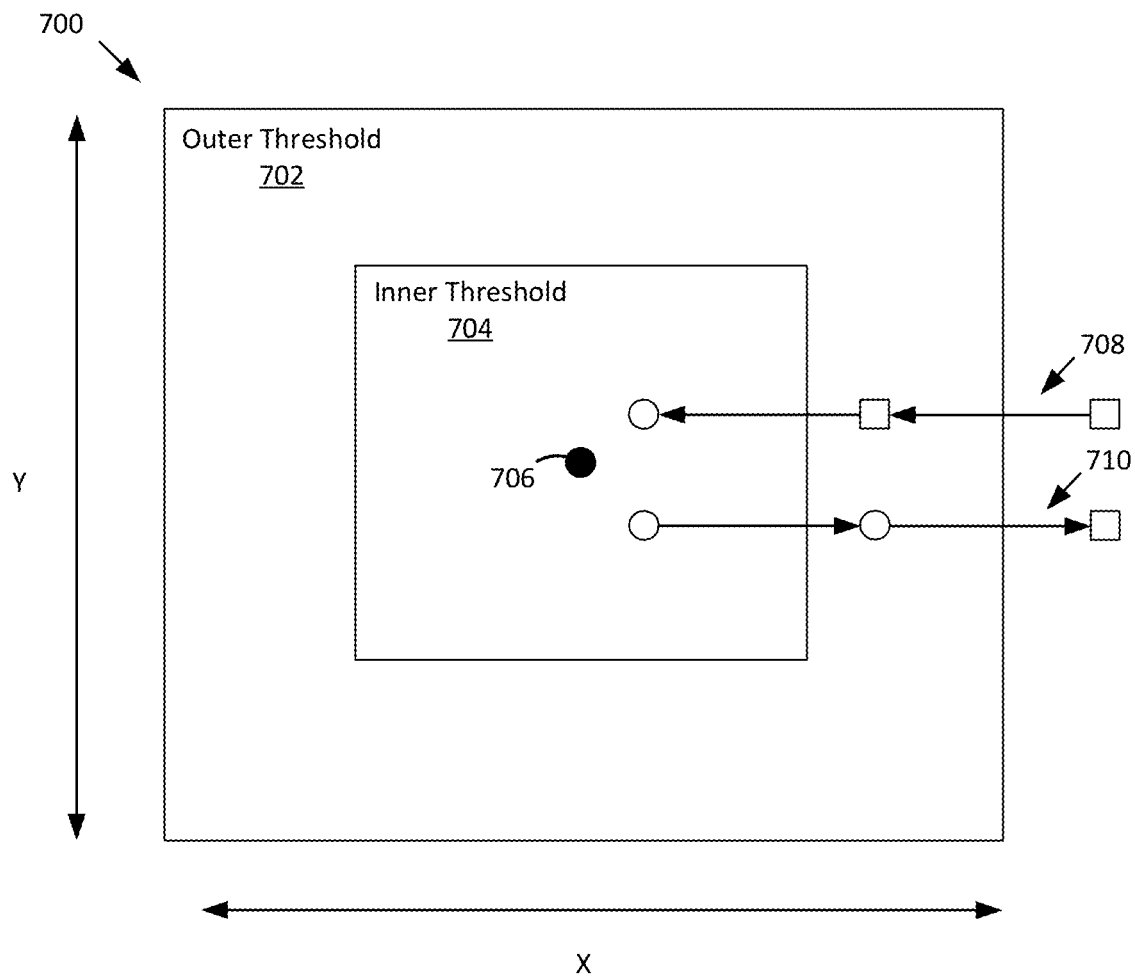
FIG. 7 is a graphical representation of robot positioning and movement within a target volume.

Reference may be made to FIGS. 6A, 6B and 7 where FIG. 6A shows robot 116 coupled to a trackable pin guide 600 in a first position at a surgical site similar to FIG. 1; FIG. 6B is an enlarged view of a portion of the trackable pin guide 600; and FIG. 7 is a graphical representation 700 of robot positioning and movement within a target volume. A surgical navigation system that is tracking the robot 116 (e.g. tracking a surgical instrument to which the robot is coupled for manipulation) can provide feedback (e.g. one or both of visual and audio feedback) to the user to confirm when rough positioning of the robotic manipulator is adequate to command placement of the surgical instrument such as a trackable pin guide 600. The system can track the position of a target bone 601 and the robot 116 (directly or via the trackable surgical instrument (e.g. 600) to which it is attached) and determine a relative position of the bone 116 and the working volume (or a subset of the volume (e.g. inner 75%)). When these determined positions sufficiently intersect, feedback can be given.

In an embodiment, robot 116 is positioned manually in a first position near the surgical site such as shown in FIG. 6A and described further with reference to FIG. 7. In an embodiment, in a manner to control robot 116 to have it place the trackable pin guide 400 at the target location (in the correct pose), surgical navigation system 106 is configured to measure the distance between the live pose vs the target pose of the pin guide. The live pose is with the pin guide coupled to the robot 116.

The surgical navigation system 106 is configured to use two thresholds, relative to the robot's working volume and hysteresis (the dependence of the state of a system on its history) behavior. The graphical representation 700 shows two positional thresholds for the robot 116 in two axes, X and Y. There is shown an outer threshold 702 and an inner threshold 704 centered about the target location 706. Outer threshold (a notional volumetric boundary) 702 represents (in 4 or 6 DOF) a parametric space of the robot which represents the limit of where robot 116 can be positioned and still reach the target location 706 such as by way of a fine alignment step. The inner threshold 704 is defined, for example, as 75% of the boundary parameter space. The hysteresis behaviour is that robot 116 (i.e. the trackable surgical instrument coupled to the robot 116) is to be manually moved within the inner threshold 704 (where the tracking software can indicate to the user that the rough alignment is correct). Time and position line 708 denotes a tracked pose of the surgical instrument such as at three instances of time represented by a square or circle. The square indicates that the pose is not within the inner threshold. The circle indicates that the pose is within the inner threshold and is thus in rough alignment to target 706. After the pose moves into this inner boundary of threshold 704, robot 116 may be moved to move the trackable surgical instrument outside of this threshold 704 (but still within the outer boundary (threshold 702)) and still be considered acceptable (in rough alignment). Time and position line 710 denotes a tracked pose of the surgical instrument such as at three instances of time, gain here a circle shows acceptable rough alignment and a square does not. If robot 116 is moved so that the instrument pose is outside of the outer boundary 702 again (right most square of line 710), robot 116/trackable surgical instrument would be considered outside of rough alignment. The robot 116 would be moved to meet the requirements of the inner threshold again to correct the movement away from rough alignment (not shown).

Thus, in an embodiment, the surgical navigation system compares the pose of the surgical instrument relative to the target bone (or target pose for the instrument relative to the bone) as a robotic manipulator is positioned at a surgical site for the target bone. The navigation system determines and signals when the surgical instrument is in rough alignment.

In an embodiment, determining when the robotic manipulator is roughly aligned comprises: defining a parameterized working volume of the robotic manipulator; defining an outer threshold comprising a volume within the parameterized working volume outside of which the robotic manipulator fails to move the surgical instrument to the target pose; defining an inner threshold volume within the outer threshold volume, the inner threshold defined to accommodate minimal movement of the robotic manipulator without losing the rough alignment; and using the inner threshold volume, (e.g. relative to the target pose or pose of the target bone) to determine if the surgical instrument is in the rough alignment.

The robot body is supported by an articulated mounting arm or stand that allows free translation and rotation in 3D space. To perform fine alignment, (i.e. while the robot 116 is being positioned to move the trackable instrument (e.g. 600) to the target pose), robot 116 (e.g. robot body) needs to be physically locked down, meaning the articulated mounting arm or stand needs to be locked such that the position and orientation of the robot 116 is fixed in space. The locking mechanism may be any suitable locking mechanism known in the art. A locking down action to restrain the robot often causes the robot to move slightly (e.g. the position of the robot shifts a little as the user is holding it during locking). It is an undesirable experience for the user to get a message that indicates the robotic manipulator is in alignment prior to being locking down, and then following rough alignment, a signal that rough alignment is not met due to a shift in the robotic manipulator's position caused by the act of locking down the robot. Alternatively or in addition, the patient's leg may also move (or be moved) before being rigidly fixed to the robot body, which may cause the robotic manipulator's position to no longer satisfy rough alignment. Rough alignment is designed to be tolerant to the small motion during locking and/or small motion of the patient's leg before being rigidly fixed to the robot body.

A 4-DOF robot makes use of only four of the six degrees of freedom for an object. It can be necessary to fix (i.e. set) the trackable pin guide in relation to the one (or both) of the degrees of freedom that it cannot control/change during operation Thus, in a second sub-operation, such as when the trackable surgical instrument is coupled to the robot, the rotational degrees of freedom of the instrument (e.g. pin guide) are set. As shown in FIG. 6A, robot 116 is coupled to the trackable pin guide 600 via a manually adjustable mounting linkage 602. As seen in the enlarged view thereof at FIG. 6B, manually adjustable mounting linkage 602 comprises a gauge 604 and releasable fastener 606. Fastener 606 may be loosened and the linkage rotated about the fastener, as measured by the gauge 604 to adjust and fix the rotational degree of freedom. When in a desired position, the fastener is tightened. Thus for a pin guide with two or more holes, the rotational degree of freedom of the pin guide can be manually set. The rotational setting to which the pin guide is fixed can be identified to the surgical navigation system such as by user input so that the configuration of the trackable pin guide is known to the navigation system. The navigation system can provide the user with degrees of rotation to set manually based on the planned resection and position of pin guide (pin guide may already have some rotation based on relative positioning of bone and robot). Alternatively, the user can choose the rotation setting and provide that input to the system to update navigation system measurements.

In an embodiment, the robot can be used to set two pin holes separately. In such a case it is not necessary to align two pin hole targets with two pin holes of the guide and thus locking in (manually setting the rotation) need not be performed. When setting the second hole, if the robot was manually positioned such that the working volume sufficiently overlaps the second target hole (e.g. within the inner threshold) a second manual movement of the robot to roughly position it need not be performed. Otherwise, any fixturing of the robot with the patient anatomy or lock down of the robot may require a reversing operation such that the robot and patient are not fixtured and the robot is not locked down to permit a second relative movement so as to achieve a second rough alignment.

As an alternative to robot movement to achieve rough alignment (e.g. for the second hole), the patient anatomy, e.g. target bone 601, can be re-positioned. The target bone and trackable instrument are tracked, rough alignment is determined and signaled such as described herein. In an embodiment, a GUI (e.g. as component of workflow for a procedure) may instruct the user to move the anatomy, and, in an embodiment, may visually show how to move (e.g. show directionally) the anatomy to the inner threshold of the working volume.

In a third sub-operation for robotic command of the trackable surgical instrument, it is confirmed that robot 116 and patient 102 (i.e. the patient's target bone 601) don't move in relation to one another to enable fine positioning. After the rough positioning and lock down, the body of the robot (which the robot reference frame is fixed to) is fixed to the patient anatomy (e.g. to the leg). For example, leg movement may be constrained by fixing the leg in a fixture to the robot. Then a measurement is made of the robot end effector position relative to a target pose to determine the robot's motion for fine alignment. This measurement is made after the robot/patient fixation since the fixation could slightly change the robot or leg position.

In a fourth sub-operation, the robot is commanded to place the pin guide into the target pose at the target location. This fine alignment adjusts the robot according to its 4-DOF movement options—x, y, pitch and roll (for example). As noted above, the mounting of the trackable pin guide 600 to robot 116 with adjustment of linkage 602 fixes some degrees of freedom. The commanded movement of the robot to position at the target pose can optimize movement in relation to x, y, pitch and roll.

It may be ideal that the tracked pin guide has spaced guide holes to set both pins with a single placement of the pin guide. But the pin guide may not have desired spacing and it may be desired to move the pin guide to a second target pose for a second target pin hole. Rough alignment may need to be repeated, such as noted. For a robot with a small workspace (e.g. 40 mm such as a Micromate™ medical robot), the process can be repeated for the second pin to set holes independently by redoing rough positioning. A pin guide can have one, two or more holes. In an alternative to additional rough position movement, the tracked pin guide can have two holes placed closer together (or have multiple holes) such that pin guide doesn't have to be moved as far to align a second hole, which may avoid having to repeat rough positioning.

In an embodiment, depth of pin placement can be controlled via a manually adjustable mechanism incorporated into adjustable mounting linkage 602 that controls the height of the pin guide above the target bone (not shown). A manually adjustable mechanism may comprise a gauge and releasable fastener to allow the height of the pin guide above the bone to be set manually. The pins may comprise a single graduation that can be used to set the depth of the pin in the chuck such that the height of the pin guide above the bone sets the depth of the pins.

In an embodiment, a robot is a 6-DOF robot (not shown), having automated yaw control (e.g. a DOF compared to the 4-DOF embodiment). Manual setting (e.g. of yaw) via linkage 602 can be avoided. In an embodiment, the pin position may be set directly such as via a tracked drill coupled to the robot 116. In an embodiment, pin guide position is set via robot 116 with automated pin guide rotation control.

In an embodiment, robot 116 is a 6-DOF robot having automated control of pin depth (e.g. a $6^{th}$ DOF) compared to the 4-DOF embodiment. In an embodiment, pin position may be set directly (and automatically) via robot 116 and pin depth may be set automatically via automated control of pin depth.

In an embodiment, robot 116 is a 6-DOF robot having automated yaw control (e.g. a $5^{th}$ DOF) and automated control of pin guide height (e.g. a $6^{th}$ DOF). In an embodiment, pin guide position is set via robot 116 with automated pin guide rotation control and pin guide height is set via robot 116 with automated control of pin guide height. In this embodiment, the pin may have a single marking.

In an embodiment, robot 116 is a 6-DOF robot having automated control of pin guide height (e.g. a $6^{th}$ DOF). In an embodiment, pin guide height is set via robot 116 with automated control of pin guide height.

Referring again to FIG. 5, at 508, a first pin is installed at the desired depth and at 510 a second pin is installed at the desired depth. In an embodiment, graduated pins are employed to assist to drive the pin to the desired depth.

In an embodiment, a surgeon selects a graduation marking based on a table provided equating resection depth to markings. A user inserts the graduated pin 320 into a chuck of a drill (not shown) until the graduated line on the pin (acting like a drill bit) corresponds to desired resection depth and geometry of planer.

In an embodiment, the trackable surgical instrument is a trackable drill for manual placement. In an example of such, surgical navigation system 106 tracks the trackable drill into which the pin is inserted and the drill is tracked to position the drill in the target pose. The drill is manually operated with navigational guidance from the system 106. In an embodiment, the trackable surgical instrument is a trackable pin guide for manual placement, for example, a tracked pin guide 400 of FIG. 4. In an example of such, surgical navigation system 106 tracks the trackable pin guide to position the pin guide in the target pose. In an embodiment, the pin guide is mounted to the target bone. A drill is prepared with the pin and the drill is manually operated. The drill is optionally tracked with navigational guidance from the system 106. In some examples, the pins are positioned and installed one at a time or both positioned and then both installed (e.g. if a pin guide with spaced pin holes at the correct distance is used).

In a robotic system embodiment with robotically-controlled placement of a pin guide by a 4-DOF robot, similar operations are performed to insert the pins using a manually operated drill. Pins can be positioned and installed one at a time or together. In a robotic system embodiment with robotically-controlled placement of a pin guide by a 6-DOF robot, similar operations can be performed. In a robotic system embodiment with robotically-controlled placement of a trackable drill by a 6-DOF robot, drilling may be automated and/or the robot is otherwise configured to control depth of the placement.

At 512, operations resect the target bone using the planer (e.g. 200). The planer bottoms out on top of the protruding pin. Two cuts are performed, one for each pin.

At 514, a 4-in-1 cutting guide is installed, using guide pin holes from the planer to complete remaining bone (femoral) cuts. As previously noted, the ability to reuse pin holes is a workflow benefit with respect to installing a cutting guide. The pin hole targets, when set to accommodate the 4-in-1 cutting guide, define the planer cut, but also are used for all the other femoral cuts. Thus spacing of the pin holes can be responsive to needs of the planer resection as well as the configuration of the respective cutting guide to be used in a subsequent step. It will be appreciated that different cutting guides may require a different pin hole spacing in the target bone. Any one or more of pin guide selection, planer pin hole spacing selection or cutting guide selection may be used to conform the pin spacing for both tasks.

The various computing devices shown herein can comprise a processing unit (for example a microprocessor, FPGA, ASIC, logic controller, or any other appropriate processing hardware), a storage device (e.g. non-transitory processor-readable storage medium, such as memory, RAM, ROM, magnetic-disk, solid state storage, or any other appropriate storage hardware) storing instructions that, when executed by the processing unit, cause the computing device to perform operations of a computer-implemented method, for example, to provide the functionality and features described herein. Computer program code for carrying out operations may be written in any combination of one or more programming languages, e.g., an object oriented programming language such as Java, Smalltalk, C++ or the like, or a conventional procedural programming language, such as the "C" programming language or similar programming languages.

Any of the computing devices may have communication subsystems to communicate via a network. Any may have a display device and other input and/or output devices.

It will be understood by a person of ordinary skill in the art that the present disclosure teaches various subject matter, such as in accordance with embodiment, and including the following subject matter summarized by the numbered statements.

Statement 1: A computer-implemented method comprising: tracking the pose of: a first tracker associated with a target bone, the first tracker providing target bone pose data; and a second tracker associated with a surgical instrument, the second tracker providing surgical instrument pose data; receiving or determining a target pose for the surgical instrument to be positioned, the target pose defined relative to the target bone; and presenting surgical navigation guidance information using one or both of surgical instrument pose data and target bone pose data, updating the surgical navigation guidance information as the surgical instrument pose data updates in response to movement of the surgical instrument; wherein: the target bone is a bone to be resected by a planer; and the surgical instrument comprises one of: a trackable drill for inserting a pin into the target bone, the pin to guide the planer while cutting; or a trackable pin guide to guide an insertion of the pin into the target bone, the pin to guide the planer while cutting.

Statement 2: The method of Statement 1, wherein the pin is a graduated pin comprising graduation markings corresponding to resection depth.

Statement 3: The method of Statement 2, wherein the surgical instrument is the trackable drill in an operable coupling with the graduated pin, the operable coupling responsive to a selected one of the graduations, and the method comprises: tracking the second tracker coupled to the trackable drill; and presenting surgical navigation information to guide the insertion of the graduated pin.

Statement 4: The method of Statement 3, wherein: the graduated pin defines a first graduated pin; following insertion of the first graduated pin, the surgical instrument comprises the trackable drill in a second operable coupling to a second graduated pin, the second operable coupling responsive to a second selected one of the graduations; and the method comprises: further tracking the first tracker and the second tracker; and presenting surgical navigation information to guide the insertion of the second graduated pin.

Statement 5: The method of Statement 1 or Statement 2, wherein the surgical instrument comprises the trackable pin guide, the trackable pin guide comprises a first hole and the target pose aligns the first hole for inserting the pin.

Statement 6: The method of Statement 5, wherein the pin defines a first pin, the trackable pin guide comprises a second hole and the target pose also aligns the second hole for inserting a second pin in the target bone.

Statement 7: The method of any one of Statements 1 to 6, wherein: the surgical instrument is coupled to a robotic manipulator to position the surgical instrument; and the method comprises commanding the robotic manipulator to move the surgical instrument to the target pose.

Statement 8: The Statement of claim 7, comprising, prior to commanding the robotic manipulator to move: comparing the pose of the surgical instrument relative to the target pose; and determining and signaling when the surgical instrument is in rough alignment with the target pose.

Statement 9: The method of Statement 8, wherein the comparing, determining and signaling are performed as the robotic manipulator and target bone are relatively positioned to provide real-time feedback.

Statement 10: The method of Statement 8 or Statement 9, wherein determining when the robotic manipulator is in rough alignment comprises: defining a parameterized working volume of the robotic manipulator; defining an outer threshold comprising a volume within the parameterized working volume outside of which the robotic manipulator fails to move the surgical instrument to the target pose; defining an inner threshold volume within the outer threshold volume, the inner threshold defined to accommodate minimal movement of the robotic manipulator without losing the rough alignment; and using the inner threshold volume, relative to the target pose to determine if the pose of the surgical instrument is within the inner threshold.

Statement 11: The method of any one Statements 7 to 10, wherein the surgical instrument comprises the trackable pin guide, and, prior to commanding the robotic manipulator, the trackable pin guide is in a coupled position on the robotic manipulator which eliminates a requirement for movement of the trackable pin guide in one or more degrees of freedom.

Statement 12: The method of any one of Statements 7 to 11, wherein movement of the target bone is constrained to the robot along all degrees of freedom.

Statement 13: The method of any one of Statements 1 to 12, wherein the surgical navigation guidance information is responsive to measurements of relative position of the target bone and the surgical instrument.

Statement 14: The method of any one of Statements 1 to 13, wherein the surgical navigation guidance information comprises one or more overlays for presenting relative to the target bone and the method comprises either or both of: determining a target pose overlay and displaying the target pose overlay via a display device; or determining a surgical instrument pose overlay and displaying the surgical instrument pose overlay via a display device.

Statement 15: The method of Statement 14, the one or more overlays are displayed in association with a real-time image of the target bone or an image from a computer model of the target bone.

Statement 16: The method of any one of Statements 1 to 15 comprising determining the target location for the surgical instrument from target bone pose data, and probe pose data received from the tracking of a probe coupled to a third tracker.

Statement 17: The method of any one of Statements 1 to 15, wherein the target pose is received or determined in response to one or more of: measurements determined by a surgical navigation system; pre-operative planning; an assumed position in relation to an anatomical landmark; and user input.

Statement 18: The method of Statement 17, wherein the target pose is determined using measurements of any one or more of: a varus/valgus angle, a flexion/extension angle, a lateral resection level, a medial resection level with respect to the target bone, and anteroposterior (AP) position of a cutting guide.

Statement 19: The method of any one of Statements 1 to 18, wherein the pin comprises a first pin and wherein tracking the second target devices comprises tracking the surgical instrument for inserting the first pin and a second pin, each of the first pin and second pin comprising graduated pins having graduated depth markings for installing in the target bone to a selected depth.

Statement 20: The method of Statement 19, wherein the selected depth is a same depth for the first pin and second pin.

Statement 21: The method of Statement 19 or Statement 20, wherein a position of the first and second graduated pins in the target bone accommodates a placement for the 4-in-1 cutting guide to re-use the position of the first and second graduated pins.

Statement 22: The method of any one of Statements 1 to 21, wherein tracking comprises tracking via an optical sensor receiving respective signals from the first tracker and second tracker.

Statement 23: The method of any one of Statements 1 to 22 comprising registering the target bone and surgical instrument for tracking to a computing device configured to perform the method.

Statement 24: The method of any one of Statements 1 to 23, wherein the planer comprises a central pion receiving channel.

Statement 25: A system configured to perform the method of any one of Statements 1 to 24, the system comprising a computing device and first and second targets.

Statement 26: A method to perform a bone cut on a patient's femur during a joint replacement surgery using a surgical navigation system; the method comprising: operating a surgical navigation system to perform tracking of the poses of: a patient element adapted to be associated with a patient to provide patient pose data; and a trackable surgical instrument; responsive to surgical navigation information determined from the tracking: positioning a first pin at a first target position on the patient's bone using one or more trackable surgical instruments; installing the first pin in the patient's bone; positioning a second pin at a second target position on the patient's bone at a set distance in relation to the first pin using one or more trackable surgical instruments; installing the second pin in the patient's bone; performing a first resection using the planer and the first pin; and performing a second resection using the planer and the second pin.

Statement 27: The method of Statement 26, wherein a respective depth of the first resection and the second resection is determined by the respective height of the first pin and the second pin above the patient's bone; a respective end of the first pin and the second pin is inserted in the planer and the planer is operated to resect until the respective pin end bottoms out on the planer.

Statement 28: The method of Statement 26 or Statement 27, wherein one or both of the first pin and the second pin comprise graduated pins having graduation markings corresponding to resection depth.

Statement 29: The method of Statement 28, wherein the first and second graduated pins are installed in the patient's bone to a same graduation marking to resect to a same depth.

Statement 30: The method of any one of Statements 26 to 29, wherein: the trackable surgical instrument is a trackable drill; the trackable drill is operably coupled to the first pin or the second pin; and the trackable drill is used for positioning and installing the first and the second pins.

Statement 31: The method of any one of Statements 26 to 29, wherein: the trackable surgical instrument is a trackable pin guide; the trackable pin guide is positioned at the first target position or the second on the patient's bone; and the trackable pin guide comprises one or more holes to accommodate at least one of the first and second pins.

Statement 32: The method of Statement 31, wherein the method comprises positioning the trackable pin guide at the first target position on the patient's bone by commanding a robotic manipulator to move the trackable pin guide coupled to the manipulator to the first target position on the patient's bone.

Statement 33: The method of Statement 31, wherein positioning the trackable pin guide to the first target position on the patient's bone comprises manually rotating the pin guide coupled to the robotic manipulator.

Statement 34: The method of Statement 32 or Statement 33, comprising, prior to commanding the robotic manipulator to move: either or both of i) moving the robotic manipulator to move the pose of the trackable pin guide relative to the first target pose or ii) moving the target bone to move the first target pose relative to the pose of the trackable pin guide; and receiving a signal when the surgical instrument and the first target pose are in rough alignment.

Statement 35: The method of Statement 34, wherein positioning the second pin at the second target position on the patient's bone comprises, following the installing of the first pin: either or both of i) moving the robotic manipulator to move the pose of the trackable pin guide relative to the second target pose or ii) moving the target bone to move the second target pose relative to the pose of the trackable pin guide; and receiving a signal when the surgical instrument and the second target pose are in rough alignment.

Statement 36: The method of any one of Statements 26 to 29, wherein: the trackable surgical instrument is a trackable drill coupled to a robotic manipulator; the trackable drill coupled to the robotic manipulator is operably coupled to the first pin or the second pin; and the trackable drill coupled to the robotic manipulator is used for positioning and installing the first and the second pins; and the method comprises positioning the trackable drill coupled to the robotic manipulator to the target position on the patient's bone by commanding a robotic manipulator to move the trackable drill coupled to the robotic manipulator to the target position on the patient's bone.

Statement 37: The method of any of Statements 26 to 34, wherein the target position on the patient's bone is provided by any one or more of: navigation system measurements; pre-operative planning; assumed position in relation to anatomical landmark; and user input.

Statement 38: The method of Statement 35, wherein the target position comprises measurements of: a varus/valgus angle, a flexion/extension angle, a lateral resection level, a medial resection level with respect to the patient's bone, anteroposterior position of cutting guide.

Statement 39: The method of any one of Statements 32 to 38, comprising fixturing the patient's bone to the robotic manipulator to constraining all degrees of freedom.

Statement 40: The method of any one of Statements 26 to 39, wherein the position of the first and second pins accommodates a target placement for a cutting guide, preferably a 4-in-1 cutting guide, useful to complete a further resection of the target bone.

Statement 41: The method of any one of Statements 26 to 40, wherein the planar comprises a central pin receiving channel.

Practical implementation may include any or all of the features described herein. These and other aspects, features and various combinations may be expressed as methods, apparatus, systems, means for performing functions, program products, and in other ways, combining the features described herein. A number of embodiments have been described. Nevertheless, it will be understood that various modifications can be made without departing from the spirit and scope of the processes and techniques described herein. In addition, other steps can be provided, or steps can be eliminated, from the described process, and other components can be added to, or removed from, the described systems. Accordingly, other embodiments are within the scope of the following claims.

Throughout the description and claims of this specification, the word "comprise", "contain" and variations of them mean "including but not limited to" and they are not intended to (and do not) exclude other components, integers or steps. Throughout this specification, the singular encompasses the plural unless the context requires otherwise. In particular, where the indefinite article is used, the specification is to be understood as contemplating plurality as well as singularity, unless the context requires otherwise.

Features, integers, characteristics, or groups described in conjunction with a particular aspect, embodiment or example of the invention are to be understood to be applicable to any other aspect, embodiment or example unless incompatible therewith. All of the features disclosed herein (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples or embodiments. The invention extends to any novel one, or any novel combination, of the features disclosed in this specification (including any accompanying claims, abstract and drawings) or to any novel one, or any novel combination, of the steps of any method or process disclosed.

What is claimed is:

1. A computer-implemented method comprising:
   tracking the pose of:
   a first tracker associated with a target bone, the first tracker providing target bone pose data; and
   a second tracker associated with a surgical instrument, the second tracker providing surgical instrument pose data and the surgical instrument coupled to a robotic manipulator to position the surgical instrument;

receiving or determining a target pose for the surgical instrument to be positioned, the target pose defined relative to the target bone;

presenting surgical navigation guidance information using one or both of surgical instrument pose data and target bone pose data, updating the surgical navigation guidance information as the surgical instrument pose data updates in response to movement of the surgical instrument; and prior to commanding the robotic manipulator to move:
  comparing the pose of the surgical instrument relative to the target pose; and
  determining and signaling that the surgical instrument is in rough alignment with the target pose;
wherein:
  the target bone is a bone to be resected by a planer; and
  the surgical instrument comprises one of:
    a trackable drill for inserting a pin into the target bone, the pin to guide the planer while cutting; or
    a trackable pin guide to guide an insertion of the pin into the target bone, the pin to guide the planer while cutting.

2. The method of claim 1, wherein the pin is a graduated pin comprising graduation markings corresponding to resection depth.

3. The method of claim 2, wherein the surgical instrument is the trackable drill in an operable coupling with the graduated pin, the operable coupling responsive to a selected one of the graduations, and the method comprises:
  tracking the second tracker coupled to the trackable drill; and
  presenting surgical navigation information to guide the insertion of the graduated pin.

4. The method of claim 3, wherein:
  the graduated pin defines a first graduated pin;
  following insertion of the first graduated pin, the surgical instrument comprises the trackable drill in a second operable coupling to a second graduated pin, the second operable coupling responsive to a second selected one of the graduations; and
  the method comprises:
    further tracking the first tracker and the second tracker; and
    presenting surgical navigation information to guide the insertion of the second graduated pin.

5. The method of claim 1, wherein the surgical instrument comprises the trackable pin guide, the trackable pin guide comprises a first hole and the target pose aligns the first hole for inserting the pin.

6. The method of claim 5, wherein the pin defines a first pin, the trackable pin guide comprises a second hole and the target pose also aligns the second hole for inserting a second pin in the target bone.

7. The method of claim 1
  comprising following signaling that the surgical instrument is in rough alignment with the target pose, commanding the robotic manipulator to move the surgical instrument to the target pose.

8. The method of claim 1, wherein determining and signaling comprises:
  determining whether the pose of the surgical instrument and the target pose are within a relative pose threshold;
  responsive to a determination that the pose of the surgical instrument and the target pose are not within the relative pose threshold, displaying a first graphical element to indicate no rough alignment; and
  responsive to a determination that the pose of the surgical instrument and the target pose are within the relative pose threshold, a second graphical element to indicate the rough alignment.

9. The method of claim 7, wherein the surgical instrument comprises the trackable pin guide, and, prior to commanding the robotic manipulator, the trackable pin guide is in a coupled position on the robotic manipulator which eliminates a requirement for movement of the trackable pin guide in one or more degrees of freedom.

10. The method of 7, wherein movement of the target bone is constrained to the robot along all degrees of freedom.

11. The method of claim 1, wherein the comparing, determining and signaling are performed as the robotic manipulator and target bone are relatively positioned to provide real-time feedback.

12. The method of claim 1, wherein determining when the robotic manipulator is in rough alignment comprises:
  defining a parameterized working volume of the robotic manipulator;
  defining an outer threshold comprising a volume within the parameterized working volume outside of which the robotic manipulator fails to move the surgical instrument to the target pose;
  defining an inner threshold volume within the outer threshold volume, the inner threshold defined to accommodate minimal movement of the robotic manipulator without losing the rough alignment; and
  using the inner threshold volume, relative to the target pose to determine if the pose of the surgical instrument is within the inner threshold.

13. The method of claim 1, wherein the surgical navigation guidance information is responsive to measurements of relative position of the target bone and the surgical instrument.

14. The method of claim 1, wherein the surgical navigation guidance information comprises one or more overlays for presenting relative to the target bone and the method comprises either or both of:
  determining a target pose overlay and displaying the target pose overlay via a display device; or
  determining a surgical instrument pose overlay and displaying the surgical instrument pose overlay via a display device.

15. The method of claim 14, wherein the one or more overlays are displayed in association with a real-time image of the target bone or an image from a computer model of the target bone.

16. The method of claim 1 comprising determining the target location for the surgical instrument from target bone pose data, and probe pose data received from the tracking of a probe coupled to a third tracker.

17. The method of claim 1, wherein the target pose is received or determined in response to one or more of: measurements determined by a surgical navigation system; pre-operative planning; an assumed position in relation to an anatomical landmark; or user input.

18. The method of claim 17, wherein the target pose is determined using measurements of any one or more of: a varus/valgus angle, a flexion/extension angle, a lateral resection level, a medial resection level with respect to the target bone, or an anteroposterior (AP) position of a cutting guide.

19. The method of claim 1, wherein the pin comprises a first pin and wherein tracking the second target devices comprises tracking the surgical instrument for inserting the first pin and a second pin, each of the first pin and second pin comprising graduated pins having graduated depth markings for installing in the target bone to a selected depth.

20. The method of claim 19, wherein one or both of:
the selected depth is a same depth for the first pin and second pin; or
a position of the first and second graduated pins in the target bone accommodates a placement for the 4-in-1 cutting guide to re-use the position of the first and second graduated pins.

* * * * *